(12) United States Patent
Kwon

(10) Patent No.: US 8,456,041 B2
(45) Date of Patent: Jun. 4, 2013

(54) VOICE COIL MOTOR

(75) Inventor: Youngju Kwon, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 238 days.

(21) Appl. No.: 12/981,197

(22) Filed: Dec. 29, 2010

(65) Prior Publication Data

US 2011/0163616 A1   Jul. 7, 2011

(30) Foreign Application Priority Data

Jan. 5, 2010   (KR) .................. 10-2010-0000462

(51) Int. Cl.
*H02K 41/03*   (2006.01)
*H02K 33/00*   (2006.01)

(52) U.S. Cl.
USPC ......................................... 310/12.16; 310/15

(58) Field of Classification Search
USPC ............................ 310/12.16, 15–39; 359/824
IPC ...................................................... H02K 41/03
See application file for complete search history.

(56) References Cited

U.S. PATENT DOCUMENTS

| | | | | |
|---|---|---|---|---|
| 5,554,537 | A * | 9/1996 | Sharpe | 435/309.1 |
| 5,693,990 | A * | 12/1997 | Miyazaki | 310/15 |
| 5,903,076 | A * | 5/1999 | Suyama | 310/81 |
| 6,825,583 | B2 * | 11/2004 | Joung et al. | 310/16 |
| 6,856,469 | B2 * | 2/2005 | Yoneyama et al. | 359/696 |
| 7,227,285 | B2 * | 6/2007 | Osaka | 310/15 |
| 2007/0194633 | A1 * | 8/2007 | Ueda et al. | 310/15 |
| 2008/0072675 | A1 * | 3/2008 | Okuda et al. | 73/627 |

* cited by examiner

*Primary Examiner* — Tran Nguyen
*Assistant Examiner* — Thomas Truong
(74) *Attorney, Agent, or Firm* — Saliwanchik, Lloyd & Eisenschenk

(57) ABSTRACT

Disclosed is a voice coil motor, including a base having an opening, a stator is disposed on the base and including a magnet, a mover including a conductive coil opposing with the magnet, and a cylindrical bobbin in which a conductive coil is installed, a case fixed on the base and covering the stator, and a spacer intervened between the stator and the case and constituted with at least two spacers, each formed with different materials to absorb pressures and shocks transmitted to the stator from external.

10 Claims, 1 Drawing Sheet

VOICE COIL MOTOR

CROSS-REFERENCE TO RELATED APPLICATION

This application claims the benefit under 35 U.S.C. §119 of Korean Application No. 10-2010-0000462, filed on Jan. 5, 2010, which is hereby incorporated by reference in its entirety.

BACKGROUND OF THE DISCLOSURE

1. Field of the Invention

This invention relates to a voice coil motor.

2. Discussion of the Related Art

Recently, various optical apparatuses have been developed, for example, a mobile phone with a built-in micro camera and a high resolution digital camera.

In case of the micro digital camera adopted to the mobile phone. It was impossible to control a distance between an image sensor and a lens adjusting a magnification and a focus. However, owing to such developments of the lens drive apparatus as the voice coil motor, the distance between the image sensor and the lens could be controlled. In particular, the voice coil motor could control the distance between the image sensor and the lens using a gravitational force and a repulsion force according to an action of magnetic fields generated by a magnet and a coil.

Generally, the voice coil motor is constituted of many components such as a mover, a spacer, and a case, for example, where each component has a manufacturing tolerance since each component is manufactured by each injection molding process or each press process, and therefore, after completion of assembling of all components, the tolerances of the components could not help being accumulated. The accumulated tolerances caused the voice coil motor to raise a problem hard to precisely drive the lens. Accordingly, the voice coil motor had a problem in that its drive operates poorly due to the accumulated tolerances. The voice coil motor had another problem in that the components constructing a voice coil motor are broken or damaged by shocks and/or vibrations transmitted to the spacer, the mover, the stator and the lens through the case from the exterior.

BRIEF SUMMARY

The present invention provides a voice coil motor that the overall tolerances generated by accumulation of the manufacturing tolerances of each component for driving the lens can be reduced, and therefore provides a voice coil motor that can inhibit the breakage or the damage of the components due to shocks or vibrations inputted from the exterior.

As an embodiment, a voice coil motor of the present invention is provided, comprising a base having an opening, a stator disposed on an upper of the base, the stator including a magnet, a mover including a conductive coil opposed to the magnet and a cylindrical bobbin securing the conductive coil, a case fixed on the base and covering the stator, and a spacer interposed between the stator and the case to absorb pressures and shocks transmitted to the stator from the exterior, the spacer being constituted with at least two spacers, each being formed with different materials.

DETAILED DESCRIPTION

Figure 1:
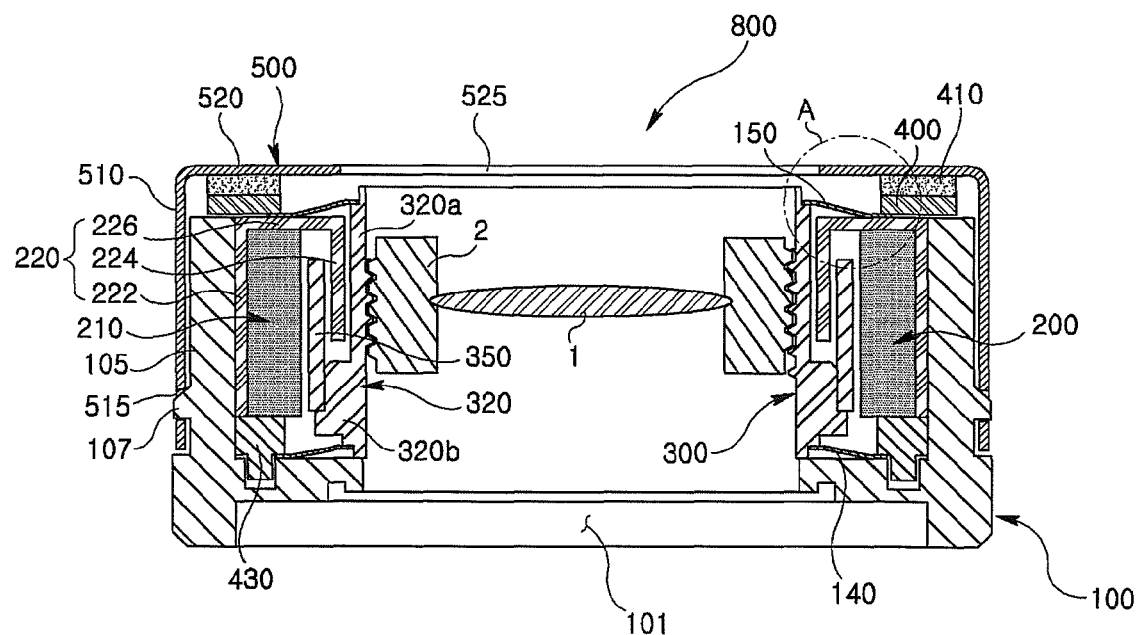
FIG. 1 is a sectional view of a voice coil motor in accordance with one embodiment of the present invention.

Hereinafter, an embodiment in accordance with the present invention will be explained in detail with reference to the accompanying drawings. In the description, the size or the shape of the components shown in the drawings may be exaggeratedly represented. Further, terms defined specifically in consideration of a construction and an operation of the embodiment of the present invention may be different according to an intention or a usual practice of user or operator. The definition to the terms should be derived on the basis of the descriptions throughout the specification.

Figure 2:
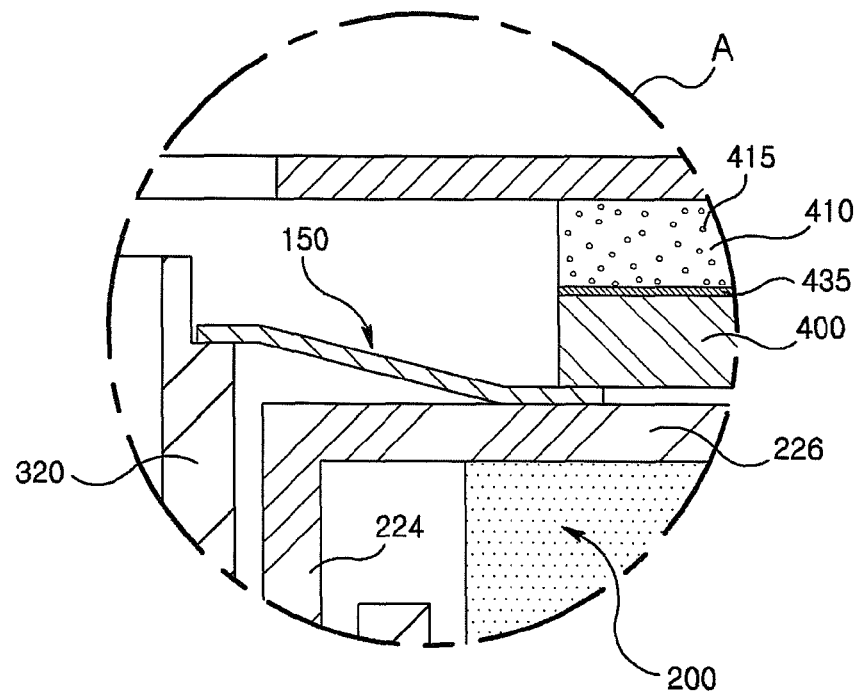
FIG. 2 is an enlarged view of "A" portion circled by dots and lines in FIG. 1.

FIG. 1 is a sectional view of a voice coil motor in accordance with the present invention, and FIG. 2 is an enlarged view of "A" portion circled by dots and lines in FIG. 1.

Referring to FIGS. 1 and 2, the voice coil motor 800 includes a base 100, a stator 200, a mover 300, a spacer including a first spacer 400 and a second spacer 410, and a case 500. In addition, the voice coil motor 800 may include an elastic member of first and second leaf springs 140, 150.

The base 100 is formed with a rectangular frame shape having an opening 101. Alternately, the base 100 may be formed with one of various shapes of cylindrical shape, etc. In an embodiment of the present invention, the opening 101 is preferably formed in the base 100 formed with a shape adapted to expose the image sensor. For example, the opening formed in the base can be formed with a rectangular or circular shape when showing on a plane.

The base 100 having the rectangular frame shape has corners at which pillars for securing are formed. For example, the pillars are preferably disposed at the four corners of the base 100. In an embodiment of the present invention, each pillar 105 may be triangle, rectangular, polygon, cylinder, etc.

Each pillar has a protruder 107 on its outer surface. This protruder 107 is coupled like a hook to the case 500 to be explained hereinafter. The stator 200 is disposed on the base 100 and includes a magnet 210 and a yoke 220. The yoke 220 is constituted of an external yoke 222 formed in outside by connection of four side plates, a plurality of internal yoke 224 disposed inside the external yoke 222, and a coupling yoke 226 for connecting the external yoke 222 and the internal yoke 224.

The external yoke 222 and internal yoke 224 are disposed to oppose mutually, and the coupling yoke 226 couples their upper ends between the external yoke 222 and the internal yoke 224. The internal yoke 224 is, for example, formed in the shape of a curved plate which is formed with the same curvature as the curvature of the coil 350 of mover 300 to be explained hereinafter. On the inside surface of the external yoke 222, a magnet 210 is attached. The back surface of the magnet 210 can be mutually joined by an adhesive, etc. with the inside surface of the external yoke 222. In an embodiment of the present invention, the magnet 210 can be preferably disposed at each corner of the external yoke 222.

The front surface of the magnet 210 opposite to the back surface of the magnet 210 opposes to the coil 350 of the mover 300, and also the front surface of the magnet 210 is formed with same curvature as the curvature of the coil 350.

The mover 300 includes a bobbin 320 and the coil 350. The bobbin 320 is formed in a shape of cylinder having the upper and lower ends passed therethrough each other to receive the lens 1. A screw forming portion is formed on the inner surface of the bobbin 320 to be coupled by a screw with a lens case 2 mounting the lens 1.

The bobbin 320 includes, for example, a first bobbin portion 320a and a second bobbin portion 320b.

The first bobbin portion 320a is formed with a first thickness when measuring from the inside surface of the bobbin 320 having a uniform inside diameter. The second bobbin portion 320b is formed with a second thickness greater than the first thickness when measuring from the inside surface of the bobbin 320 having a uniform inside diameter. The second bobbin portion 320b is formed at the lower portion. On the boundary of the first bobbin portion 320a and the second bobbin portion 320b, a step is formed by a difference of the thicknesses.

While, on the upper end of the second bobbin portion 320b, a seat is formed to resiliently couple with one end of the upper leaf spring 150 to be explained hereinafter. The coil 350 is fixed on the outside surface of the second bobbin portion 320b. Between the coil 350 and the first bobbin portion 320b, a gap is formed. The internal yoke 224 is inserted into the gap. Magnetic fields generated respectively in the coil 350 and the magnet 210 are shielded by the external yoke 222, the internal yoke 224 and the coupling yoke 226.

By the magnet fields generated from the coil 350 and the magnet 210, a force upwardly acting to the base 100 is generated in the coil 350. As the result, the coil 350 and the bobbin 320 are moved upwardly on the base 100.

The spacer including, the first and second spacers 400, 410 is intervened between the stator 200 and the case 500. Thereby, it absorbs pressures and shocks transmitted from the exterior. The first and second spacers 400, 410 may be formed with at least two materials different each other. The first spacer 400 is disposed between the stator 200 and the case 500. For example, the first spacer 400 is disposed between the coupling yoke 220 and the case 500.

The first spacer 400 has a shape of plate having an opening. In the embodiment of the present invention, the first spacer 400 is formed with a main material of synthesis resin. For example, the spacer 400 includes a component of PolyethyleneTerephthalate (PET) and has an enough hardness to eliminate the manufacturing tolerance of each component.

Referring to FIG. 2, the second spacer 410 is disposed on the first spacer 400. For example, the second spacer 410 is intervened between the first spacer 400 and the case 500 which will be explained hereinafter. In the embodiment of the present invention, the second spacer 410 includes a porous material. The second spacer 410 according to the present invention can decrease the manufacturing tolerances of the components disposed at the lower portion, and also can absorb the shocks transmitted to the interior from the exterior, thereby inhibiting the components disposed at the lower portion from being broken or damaged by the shocks.

The second spacer 410 includes a plurality of pores 415 to compensate the manufacturing tolerances of components disposed at the lower portion of the first spacer and to absorb the shocks transmitted from the exterior. The pores included in the second spacer 410 not only include air, but also increase the surface area of the second spacer 410. Therefore it is possible to reduce the pressure transmitted to the first spacer 400 by the shock absorption force and the elastic force.

In the embodiment of the present invention, the second spacer 410 may include a blowing resin generating a plurality of pores. While the second spacer 410 may be formed same as the shape of the first spacer 300 when seeing on the plane surface. Further, when the second spacer 410 applies the pressure to the first spacer 400, since the adhesive 435 is intervened between the first spacer 400 and the second spacer 410, the position changes of the first and second spacers 400, 410 and an escape of the second spacer 410 from the first spacer 400 can be inhibited.

In an embodiment of the present invention, the first spacer 400 and the coupling yoke 226 can be mutually adhered. Also, the second spacer 410 can be adhered with the second case portion 520 of the case 500 which will be explained in below.

Referring to FIG. 1, a lower spacer 430 has, for example, the rectangular frame shape and is intervened between the base 100 and the magnet of the stator 200. Further, the lower spacer 430 plays to electrically insulate the first leaf spring 140 and the stator 200 which will be explained in below and plays to secure the first leaf spring 140 on the base 100.

The first leaf spring 140 and the second leaf spring 150 support elastically the bobbin 320. Further, the first leaf spring 140 and the second leaf spring 150 make the mover 300 to shift to the upper position by their elasticity when the mover 300 shifts upwardly to the stator 200, while, makes the mover 300 not to move in a predetermined position when the mover 300 is returned to the original position.

One end of the first leaf spring 140 is intervened between the lower spacer 430 and the base 100, and on the other hand, the other end of the first leaf spring 140 is coupled to the upper end of the outside surface of the bobbin 320. One end of the second leaf spring 150 is intervened between the first spacer and the coupling yoke 226 of the yoke 220, and on the other hand, the other end of the second leaf spring 150 is coupled to the upper end of the outside surface of the bobbin 320.

The first and second leaf springs 140, 150 have a shape of plate having a very thin thickness to generate an elastical deformation by an external force and may include a metal plate of approximately 50 μm thickness. The case 500 includes a first case portion 510 and a second case portion 520.

The first case portion 510 is parallelly disposed to the pillar 105 of the base 100 and has a rectangular frame shape. In the first case portion 510, a via hole 515 is formed to be coupled in the type of hook with the protruder 107 formed on the pillar 105.

The second case portion 520 is extended in direction parallel to the second spacer 410 from the first case portion 510. Further, the second case portion 520 covers the second spacer 410 and has an opening 525 exposing the bobbin 320.

In the embodiment of the present invention as mentioned in the above, though the first spacer 400 constituted of the PET material is disposed on the yoke and the second porous spacer 410 is disposed on the first spacer 400, differently, the porous second spacer 410 may be disposed on the yoke 220 and the second spacer 400 constituted of the PET material may be disposed on the second spacer 410.

In accordance with the detail description as mentioned above, owing that the second spacer reducing the pressure transmitted to the first spacer is disposed between the case and first spacer, the shocks transmitted from the exterior and the breakage or damage occurred by the shocks can be inhibited, and also the accumulated tolerances transmitted to the stator and the base, which are disposed in the lower portion of the first spacer, can be relieved or eliminated.

While the invention has been shown and described with reference to exemplary embodiments thereof, it will be understood by those skilled in the art that various changes in form and details may be made therein without departing from the spirit and scope of the invention as defined by the appended claims.

What is claimed is:

1. A voice coil motor comprising:
   a base having an opening;

a stator disposed over an upper surface of the base and including a magnet;

a mover including a conductive coil opposite to the magnet and a bobbin coupled to the conductive coil;

a case fixed on the base and covering the stator; and a spacer interposed between the stator and the case to absorb pressures and shocks applied to the stator from the exterior, the spacer formed with at least two spacers, each formed with different materials, wherein the spacers include a first spacer and a second spacer adjoining mutually, and wherein each of the first and second spacers has shape having an opening exposing the bobbin.

2. The voice coil motor set forth in claim 1, wherein at least one of the first spacer and the second spacer is formed with a porous material.

3. The voice coil motor set forth in claim 2, wherein the first spacer and the second spacer are subsequently disposed between the case and the stator, the second spacer is formed with a porous material.

4. The voice coil motor set forth in claim 3, wherein the second spacer comprises an expanded resin formed with a plurality of pores.

5. The voice coil motor set forth in claim 4, wherein each of the pores includes air.

6. The voice coil motor set forth in claim 2, wherein the first spacer and the second spacer are formed with the same shape when shown from a plane.

7. The voice coil motor set forth in claim 2, further comprising an adhesive between the first spacer and the second spacer.

8. The voice coil motor set forth in claim 2, wherein one of the first spacer and the second spacer is formed with the porous material using a synthetic rubber as a main material, the other being formed with PolyethyleneTerephthalate (PET).

9. The voice coil motor set forth in claim 1, wherein the stator comprises a yoke setting the magnet, one of the first spacer and the second spacer contacting the yoke, the other contacting the case.

10. The voice coil motor set forth in claim 9, wherein an elastic member is interposed between the first spacer and the yoke, one end of the elastic member being intervened between the first spacer and the yoke, and the other end being coupled on the bobbin.

* * * * *